(12) United States Patent
Knowles

(10) Patent No.: US 8,180,582 B2
(45) Date of Patent: May 15, 2012

(54) SYSTEM AND METHOD FOR SENSING LIQUID LEVELS

(75) Inventor: Terence J. Knowles, Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 425 days.

(21) Appl. No.: 12/422,379

(22) Filed: Apr. 13, 2009

(65) Prior Publication Data
US 2009/0312965 A1    Dec. 17, 2009

Related U.S. Application Data

(60) Provisional application No. 61/060,985, filed on Jun. 12, 2008.

(51) Int. Cl.
*G06F 19/00* (2011.01)

(52) U.S. Cl. ............... 702/55; 702/39; 702/54; 702/103; 702/166; 324/691; 324/693; 324/696; 73/290 V; 73/64.53

(58) Field of Classification Search ................ 702/55, 702/159
See application file for complete search history.

(56) References Cited

U.S. PATENT DOCUMENTS

| | | | | |
|---|---|---|---|---|
| 3,080,752 A * | 3/1963 | Rich | ............................ | 73/290 V |
| 3,884,074 A | 5/1975 | Robertsson | ...................... | 73/290 |
| 3,975,958 A * | 8/1976 | Hope | ........................... | 73/290 V |
| 4,248,087 A * | 2/1981 | Dennis et al. | ................ | 73/290 V |
| 4,733,560 A * | 3/1988 | Dam | ........................... | 73/304 C |
| 4,893,496 A * | 1/1990 | Bau et al. | ....................... | 73/32 A |
| 6,218,949 B1 * | 4/2001 | Issachar | ........................ | 340/624 |
| 6,629,457 B1 * | 10/2003 | Keller | .......................... | 73/290 V |
| 2004/0046571 A1 * | 3/2004 | Champion et al. | ............ | 324/637 |
| 2005/0005696 A1 * | 1/2005 | Hale et al. | .................... | 73/290 V |

FOREIGN PATENT DOCUMENTS

| WO | WO 2004/023086 | 9/2003 |
|---|---|---|
| WO | WO 2006/100048 | 3/2006 |

OTHER PUBLICATIONS

International Search Report and Written Opionion for PCT/US2009/040905, (Jul. 28, 2009).

* cited by examiner

*Primary Examiner* — Jonathan C Teixeira Moffat
*Assistant Examiner* — Timothy H Hwang
(74) *Attorney, Agent, or Firm* — Mark W. Croll; Paul F. Donovan

(57) ABSTRACT

A system for detecting a presence of a liquid within a receptacle includes a sensor and a processor. The sensor includes a transmitting probe and a receiving probe positioned within the liquid receptacle. The transmitting probe includes a first transducer and the receiving probe includes a second transducer. The processor is in electrical communication with the first and second transducers and monitors the first and second transducers to determine the presence and level of the liquid within the liquid receptacle based on a time between generation of a first extensional wave by the first transducer and reception of a second extensional wave by the second transducer.

16 Claims, 4 Drawing Sheets

SYSTEM AND METHOD FOR SENSING LIQUID LEVELS

RELATED APPLICATIONS

This application relates to and claims priority benefits from U.S. Provisional Patent Application No. 61/060,985 entitled "Multifunctional Liquid Level Sensor," filed Jun. 12, 2008, which is hereby incorporated by reference in its entirety.

FIELD OF EMBODIMENTS OF THE INVENTION

Embodiments of the present invention generally relate to a system and method for sensing a level of a liquid within a retaining structure, and more particularly, to a multifunctional, self-calibrating liquid level sensing system and method.

BACKGROUND

Liquids may be contained in a variety of receptacles. For example, an automobile typically contains fuel within a fuel tank. In various applications, it is important to know the level of liquid within a receptacle. Again, for example, an operator of an automobile typically needs to know the amount of fuel left within a fuel tank.

SUMMARY OF EMBODIMENTS OF THE INVENTION

Certain embodiments of the present invention provide a system for detecting a presence of a liquid within a liquid receptacle. The system includes a liquid level sensor and a processor in communication with the liquid level sensor.

The sensor may include a transmitting probe and a receiving probe positioned within the liquid receptacle. The transmitting probe includes a first transducer and the receiving probe includes a second transducer. The first transducer generates a first extensional wave through the transmitting probe that produces a compressional wave in a liquid contained within the liquid receptacle when the first extensional wave contacts an interface between the transmitting probe and a surface of the liquid. The compressional wave contacts the receiving probe and generates a second extensional wave within the receiving probe that is received by the second transducer.

The processor is in electrical communication with the first and second transducers. The processor monitors the first and second transducers to determine the presence and level of the liquid within the liquid receptacle based on a time between generation of the first extensional wave by the first transducer and reception of the second extensional wave by the second transducer.

The transmitting and/or receiving probes may include a solid rod or a planar strip. In another embodiment, one of the probes includes a hollow open-ended cylinder and the other includes a solid rod within the hollow open-ended cylinder. Each of the transducers may include a piezoelectric or EMAT transducer.

The transmitting and receiving probes may be coupled together through a sliding carriage. The sliding carriage may be formed of a buoyant material, such as Styrofoam.

The processor can detect a time $T_M$ from initiating transmit pulses in the first transducer to detecting a leading edge of the second extensional wave at the second transducer. The processor can also detect a time T1 it takes for the first extensional wave to travel down a length of the transmitting probe, reflect and return to the first transducer. The processor can also detect a time T2 from initiating a transmit pulse by the first transducer to detecting a leading edge of a third extensional wave in the receiving probe.

Certain embodiments of the present invention provide a method of detecting a presence of a liquid within a liquid receptacle. The method may include positioning a sensor having a transmitting probe and a receiving probe within the liquid receptacle, generating a first extensional wave through a first transducer mounted on the transmitting probe, producing a compressional wave in a liquid contained within the liquid receptacle when the first extensional wave impinges upon a liquid surface, receiving the compressional wave at the receiving probe, producing a second extensional wave within the receiving probe when the compressional wave contacts the receiving probe, and using a processor to monitor the first and second transducers to determine the presence and level of the liquid within the liquid receptacle based on a time between generation of the first extensional wave and reception of the second extensional wave at the transducer.

The method may also include using the processor to monitor the first and second transducers to determine one or both of conductivity and/or viscosity of the liquid within the liquid receptacle.

Certain embodiments of the present invention provide a sensor for detecting a presence of a liquid within a liquid receptacle. The sensor may include a transmitting probe comprising a first transducer. The transmitting probe is configured to be positioned with the liquid receptacle. The sensor may also include a receiving probe including a second transducer. The receiving probe is also configured to be positioned within the liquid receptacle. The transmitting and receiving probes are spaced a known distance apart. The first transducer is operable to generate a first extensional wave through the transmitting probe. When the first extensional wave contacts the interface between the transmitting probe and a surface of the liquid, a compressional wave is produced in the liquid. The receiving probe generates a second extensional wave within the receiving probe when the compressional wave contacts the receiving probe. The second extensional wave is received by the second transducer. A presence and level of the liquid is determined based on a time between generation of the first extensional wave by the first transducer and reception of the second extensional wave by the second transducer.

Figure 1:
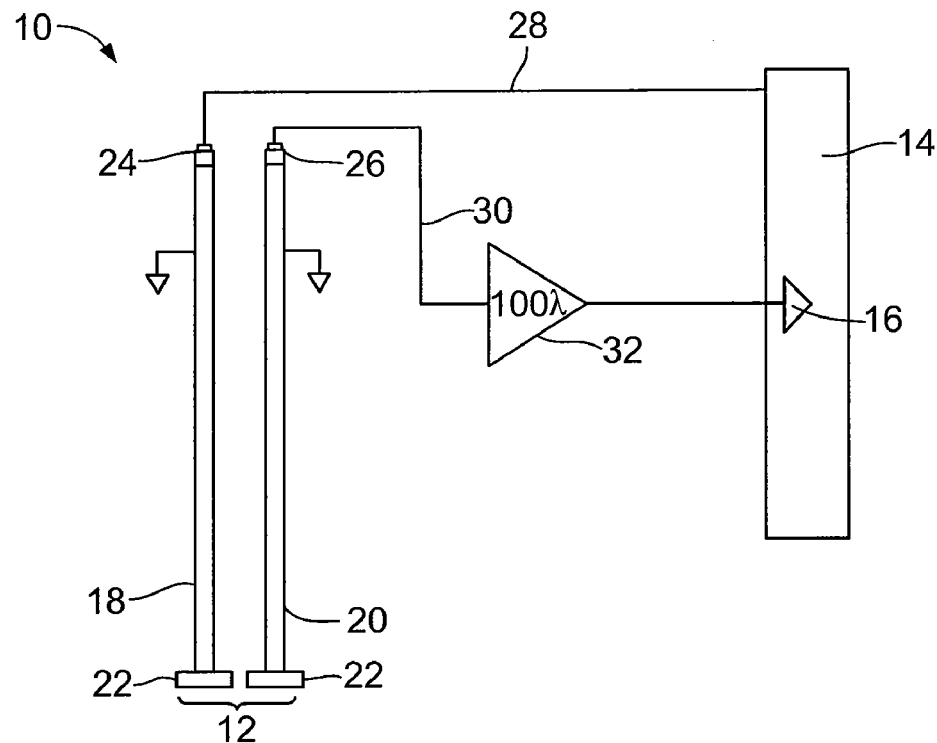
FIG. 1 illustrates a schematic diagram of a liquid level sensing system, according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 1 illustrates a schematic diagram of a liquid level sensing system 10, according to an embodiment of the present invention. The system 10 includes a liquid level sensor 12 connected to a processor 14, which may include a comparator 16. The sensor 12 includes a transmitting probe 18 and a receiving probe 20. Each probe 18 and 20 may include a support base 22 that allows the probes 18 and 20 to stand upright within a liquid receptacle. That is, the bases 22 may abut against a retaining surface of the liquid receptacle. Optionally, the probes 18 and 20 may be secured to retaining walls and/or surfaces of the liquid receptacle, such as through clamps or other fasteners. The probes 18 and 20 may be rods, strips and/or tubes.

A transducer 24, such as a piezoelectric transducer, is secured to an upper end of the transmitting probe 18, while a transducer 26, such as a piezoelectric transducer, is secured to an upper end of the receiving probe 20. The transducer 24 is configured to generate an extensional ultrasonic wave through and over the length of the transmitting probe 18, while the transducer 26 is configured to detect an extensional ultrasonic wave generated within the receiving probe 20. Optionally, the transducers 24 and 26 may be mounted to other portions of the probes 18 and 20, respectively, other than the respective upper ends.

The transducer 24 is electrically connected to the processor 14 through an electrical wire 28, while the transducer 26 is electrically connected to the processor 14 through an electrical wire 30. Optionally, the transducers 24 and 26 may be wirelessly connected to the processor 14. In either case, the processor sends a wave transmission signal to the transducer 24 through the wired or wireless connection, thereby causing the transducer 24 to generate an extensional wave within the probe 18. The processor 14 receives wave detection signals from the transducer 26 via the wired or wireless connection. An amplifier 32 may be disposed within the electrical path 30 in order to amplify the detected signals. The processor 14 compares signals from the transducers 24 26, such as through the comparator 16. In operation, the processor 14 determines the presence and level of a liquid within a liquid receptacle from signals sent to and received from the transducers 24 and 26, as described below.

Figure 2:
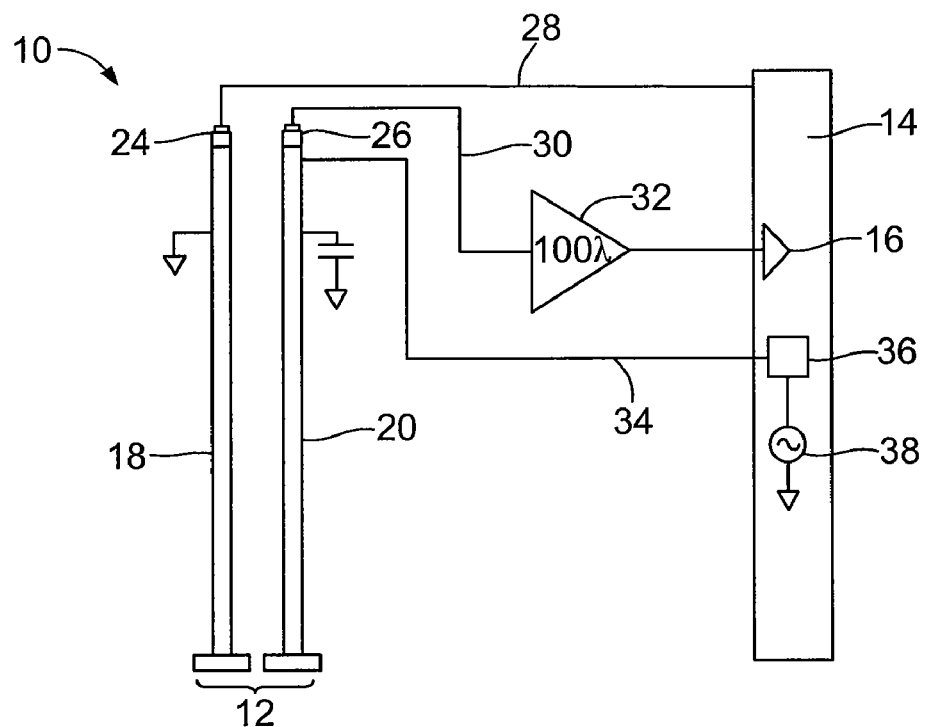
FIG. 2 illustrates a schematic diagram of a liquid level sensing system, according to an embodiment of the present invention.

FIG. 2 illustrates a schematic diagram of the liquid level sensing system 10, according to an embodiment of the present invention. The system 10 is similar to that shown and described in FIG. 1, except that the receiving probe 20 is part of a fluid resistivity circuit 34 connected to the processor 14. The resistivity circuit 34 may also include a current detector 36 and an oscillator 38.

Figure 3:
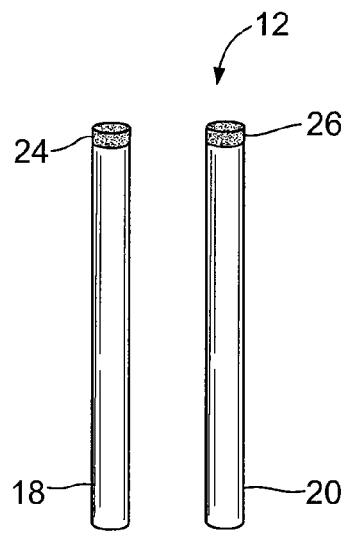
FIG. 3 illustrates a front view of a liquid level sensor, according to an embodiment of the present invention.

FIG. 3 illustrates a front view of a liquid level sensor 12, according to an embodiment of the present invention. The transmitting and receiving probes 18 and 20 may be cylindrical rods, as shown in FIG. 3.

Figure 4:
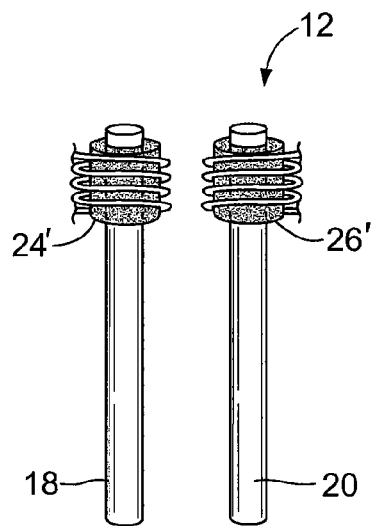
FIG. 4 illustrates a front view of a liquid level sensor, according to an embodiment of the present invention.

FIG. 4 illustrates a front view of a liquid level sensor 12, according to an embodiment of the present invention. Instead of piezoelectric transducers, magnets and coils 24' and 26', such as toroidal magnets and coils, may be secured to the probes 18 and 20, respectively. The magnet and coil 24' is configured to generate an extensional wave within the probe 18, while the magnet and coil 26' is configured to detect an extensional wave within the probe 20.

Figure 5:
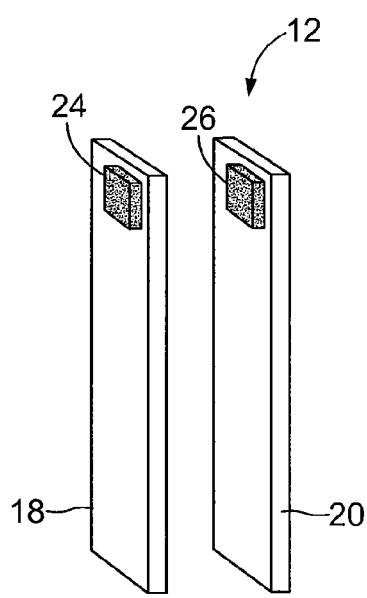
FIG. 5 illustrates a front isometric view of a liquid level sensor, according to an embodiment of the present invention.

FIG. 5 illustrates a front isometric view of a liquid level sensor 12, according to an embodiment of the present invention. In this embodiment, the probes 18 and 20 are formed as planar strips with the transducers 24 and 26, respectively, mounted to planar surfaces of the strips.

Figure 6:
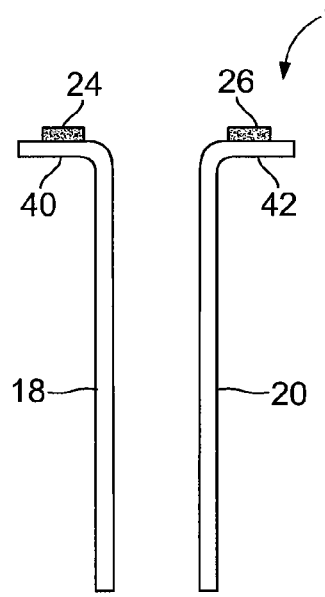
FIG. 6 illustrates a front view of a liquid level sensor, according to an embodiment of the present invention.

FIG. 6 illustrates a front view of a liquid level sensor 12, according to an embodiment of the present invention. In this embodiment, the probes 18 and 20 may be cylindrical rods or planar strips having upper ledges 40 and 42, respectively, that are generally perpendicular to the remaining length of the probes 18 and 20. The transducers 24 and 26 are mounted on top of the ledges 40 and 42, respectively. The right angle bends are used to accommodate particular mounting requirements.

Figure 7:
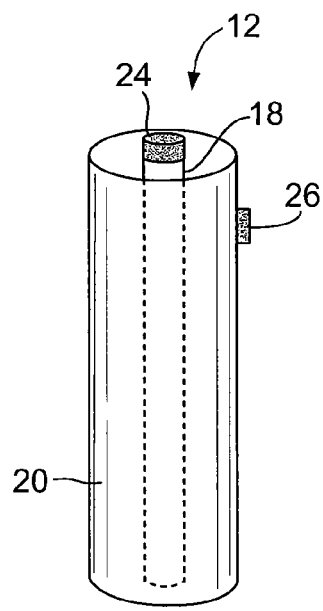
FIG. 7 illustrates a front isometric view of a liquid level sensor, according to an embodiment of the present invention.

FIG. 7 illustrates a front isometric view of a liquid level sensor 12, according to an embodiment of the present invention. In this embodiment, the transmitting probe 18 is a cylindrical rod 18, while the receiving probe 20 is a hollow tube. The transmitting probe 18 is positioned within a central channel of the receiving probe 20. Optionally, the transmitting probe 18 may be a hollow tube, while the receiving probe 20 may be a cylindrical rod.

In general, the liquid level sensor 12 may be any of the configurations shown and described with respect to FIGS. 3-7. The transducers 24 or 26 may be piezoelectric or EMAT transducers operating in either compressional or radial mode that are capable of producing and sensing ultrasonic extensional waves within the probes 18 and 20. Also, as described with respect to FIG. 4, instead of transducers, magnets may be used.

The probes 18 and 20 may be formed of any material capable of supporting extensional waves. The rods and strips that may form the probes 18 and 20 may be fabricated from stainless steel, steel, aluminum, alumina, glass and glass loaded polyphenylene sulphone (PPS), plastic or the like.

Figure 8:
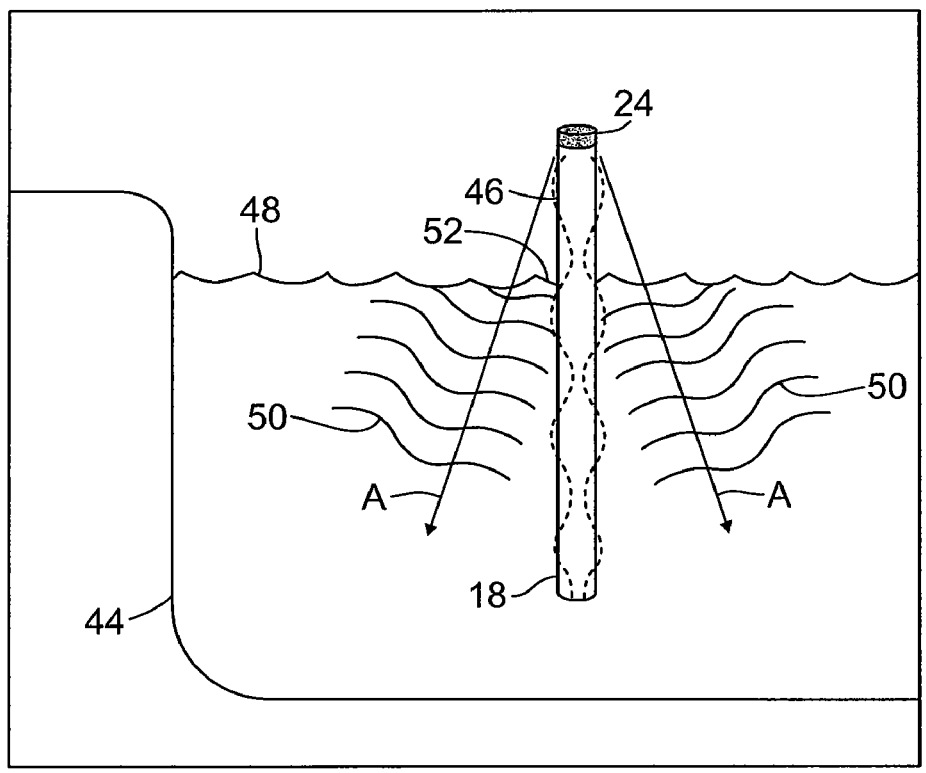
FIG. 8 illustrates a front view of a transmitting probe, according to an embodiment of the present invention.

FIG. 8 illustrates a front view of a transmitting probe 18 within a fluid receptacle 44, according to an embodiment of the present invention. The probe 18 may be supported above the lower retaining wall of the fluid receptacle 44 through a support base 22 or the probe 18 may be secured to an interior wall of the fluid receptacle 44 through a clamp or other fasteners.

The transducer 24 receives a signal from the processor 14 (shown in FIGS. 1 and 2) to generate an extensional wave within the probe 18. The transducer 24 is excited by an oscillatory voltage burst that causes extensional waves 46 to travel along the transmitting probe 18. Accordingly, the transducer 24 vibrates or resonates the probe to generate an extensional wave 46 that travels over the length of the probe 18. Extensional waves in the transmitting probe 18 have an out of plane displacement that, when immersed in a fluid, converts or couples to compressional waves 50 in the fluid. As the extensional wave 46 encounters liquid 48 within the receptacle 44, the wave energy is transmitted into the liquid as compressional waves 50 that propagate in the liquid in the directions of arrows A. That is, the extensional waves 46 generated in the probe 18 are converted or coupled to compressional waves 50 within the liquid 48. The compressional waves 50 outwardly propagate from the fluid interface 52 in the directions of arrows A.

Figure 9:
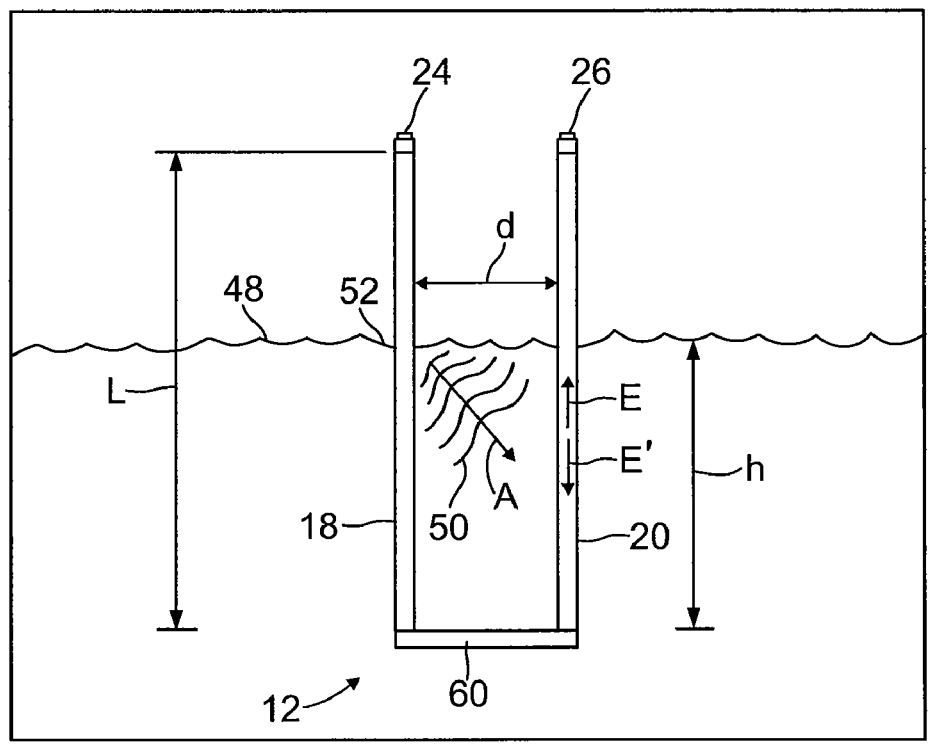
FIG. 9 illustrates a front view of a liquid level sensor positioned in a fluid receptacle, according to an embodiment of the present invention.

FIG. 9 illustrates a front view of the liquid level sensor 12 positioned in the fluid receptacle, according to an embodiment of the present invention. The length of the probes 18 and 20 is denoted as L, while the liquid level within the receptacle is defined as h. As the compressional waves 50 encounter the receiving probe 20, they couple or convert to extensional waves within the receiving probe 20. The extensional waves are then detected by the transducer 26 located on the receiving probe 20. The transducer 26 converts the detected extensional waves to an oscillatory voltage burst, which is sent to the processor 14 (shown in FIGS. 1 and 2).

The arrival times of the compressional waves 50 at the receiving probe 20 are defined and the travel time between the transducers 24 and 26 is linearly dependent on the level h of the liquid 48. Consequently, the level h of the liquid 48 can be determined through the waves generated and received between the probes 18 and 20.

It has been found that the receiving probe 20 receives the compressional waves and converts them to extensional waves, as described above, only when the probes 18 and 20 are in contact with a liquid or liquid-like substance. That is, a signal from the transducer 26 on the receiving probe 20 will only be detected at the processor 14 when the acoustic path is completed due to the presence of a medium, such as water, capable of supporting compressional waves. Thus, if the transducer 24 activates to produce an extensional wave within the probe 18, but the transducer 26 on the probe 20 does not detect an extensional wave (due to no compressional wave passing from the probe 18/liquid 48 interface), then it is determined that no liquid is present. Consequently, the probes 18 and 20 can be used to detect the presence of liquid.

The level h of the liquid within the fluid receptacle may also be determined, such as through the processor 14. The dry path length between the transmitting probe 18 and the receiving probe 20 varies, and is linearly dependent on the liquid level h. The length of the probes 18 and 20 that is not submerged in liquid is defined by the length L of the probes 18 and 20 minus the level h of the water (L−h). Thus, the dry path length $P_L$ is calculated as follows:

$$P_L = d + 2(L-h)$$

where d is the horizontal distance between the probes 18 and 20, L is the length of the probes 18 and 20 and h is the level of liquid within the receptacle. Thus, $$P_L = k - 2h$$

Where k is a known constant.

The compressional waves 50 in the liquid 48 and the extensional waves 46 in the probes 18 and 20 are non-dispersive. Thus, the arrival times of the waves 50 at the receiving probe 20 are well defined. Further, the travel time of the waves 50 between the probes 18 and 20 is also linearly dependent on the liquid level h.

The condition for non-dispersive extensional modes has been determined to be an acoustic wavelength greater than the diameter or thickness of the probes 18 and 20 by a factor of at least 2.2. This then determines maximum operating frequency. For example, with a rod shaped stainless steel probe, $$F_{max} = 0.45(V_e/d)$$

where $V_e$ is the extensional wave velocity and d is the diameter of the rod.

As noted above, as the compressional waves 50 impinge on the receiving probe 20, extensional waves are generated in the receiving probe 20. In particular, extensional waves E and E' are generated in the receiving probe 20, where E travels up the receiving probe 20, while E' travels down the receiving probe 20. The elapsed time ($T_M$) from initiating transmit pulses in the transducer 24 on the transmitting probe 18 to detecting the leading edge of the upwards traveling extensional wave E varies with, and is used to measure, the level h of the liquid. That is, the processor 14 shown in FIGS. 1 and 2 determines this elapsed time and is able to determine the liquid level h through this elapsed time.

The processor 14 also detects the time it takes for an extensional wave to travel down the length of the transmitting probe 18, reflect and return. This time is denoted as T1. The processor 14 also detects the elapsed time from initiating a transmit pulse to detecting the leading edge of the downwards traveling extensional wave E' in the receiving probe (T2). T2 equals T1 plus the time it takes to travel from one probe 18 or 20 to the other 18 or 20. Thus, the difference between T2 and T1 is $T_W$, or the time in the liquid. That is, $$T2 - T1 = T_W$$

A relevant measure for liquid level detection is the wetted length of a probe 18 or 20. Thus, referring to FIG. 9, $$h/L = (T2 - T_M)/T1$$

Thus, solving for liquid level h, $$h = ((T2 - T_M)L)/T1$$

Because the length L of the probes 18 and 20 is known, the processor 14 can determine the liquid level h by measuring times T1, T2 and $T_M$.

Further, it has been found that embodiments of the present invention are self-calibrating. By measuring T1, T2 and $T_M$ and employing the equation above, temperature dependence due to changes in wave velocities in both the probes 18 and 20 and the liquid is eliminated. To clarify, the times T1, T2, $T_W$ and $T_M$ are calculated from the wave velocities and lengths, as noted above. That is, T2 is T1 plus $T_W$, the time in the liquid. $T_M$ is the time in the liquid plus the time in the dry portions of the probe. Further, $$T_M = T_W + 2(L-h)/V_e$$

where $V_e$ is the extensional wave velocity. However, $$2L/V_e = T1$$

Thus, substituting the above, it is discovered that the time in the liquid and the extensional wave velocity cancel, leaving the resulting expression, h/L.

Aging effects due to changes in the bonds between the transducers 24 and 26 and the probes 18 and 20, respectively, affect signal amplitude, but not timing. Thus, as long as there is sufficient signal amplitude to ensure accurate detection of the leading edges of the waves, aging effects are eliminated. Thus, the amplifiers 32, such as shown in FIGS. 1 and 2 may be used to amplify the signals.

Referring to FIGS. 1-9, embodiments of the present invention may be used to determine the state or condition of fluids, such as lubricant oils, in order to determine oil replacement schedules and excessive wear. Due to the fact that the probe spacing (d) is known and fixed, and the time of a wave in the fluid is measured, the acoustic velocity of a wave in the fluid is simply $d/T_W$. Measuring the resistance between the probes 18 and 20 (such as through the embodiment shown in FIG. 2), and the wetted probe length allows a calculation of fluid resistivity. Changes in fluid viscosity can be calculated from changes in returned amplitude. Because the wetted probe length is known, fluid viscosity can be calculated. That is, when measured times begin to vary over time, one can deduce that the nature of the liquid is changing. Such changes can be correlated to varying viscosities. Thus, in addition to determining liquid level, with small or negligible incremental cost, the conductivity and viscosity of a liquid can also be determined.

Referring again to FIG. 9, the probes 18 and 20 may be connected by a sliding carriage 60, which may be located at various points along the probes 18 and 20. The carriage 60 acoustically couples the probes 18 and 20. Consequently, the arrival time of the upward wave E at the transducer 26 is linearly dependent on the position of the carriage 60 along the probes 18 and 20.

The carriage 60 may include passages through which the probes 18 and 20 are slidably positioned. The carriage 60 may be formed of a buoyant material. As such, the carriage 60 may float at the surface of the water, while being slidably secured to the probes 18 and 20. Thus, as the water level changes, the acoustic path from the transducer 24 through the carriage 60 and to the transducer 26 changes accordingly. The length of this path is determined by the processor 14, similar to how the lengths of the acoustic paths are determined in the embodiments noted above. The longer the acoustic path, the lower the level of the liquid. The processor 14 correlates the length of the acoustic path with the level of liquid.

Further, it has been found that ice acoustically couples the probes 18 and 20 together, in a similar manner as the acoustic carriage 60 couples the probes 18 and 20 together. The length of the acoustic path spanning from the transducer 24 through the ice surface to the transducer 26 is correlated with the level of ice within a receptacle. Thus, embodiments of the present invention can be used to detect the presence of ice, in addition to liquids, such as water, as well as detecting ice thickness.

It has also been found that embodiments of the present invention provide a system and method in which the acoustic path between the transducers 24 and 26 is not significantly affected by the build-up of contaminants such as scale and grease on the probes 18 and 20, presumably because the wave motion couples through calcium carbonate (scale) or grease layers.

Figure 10:
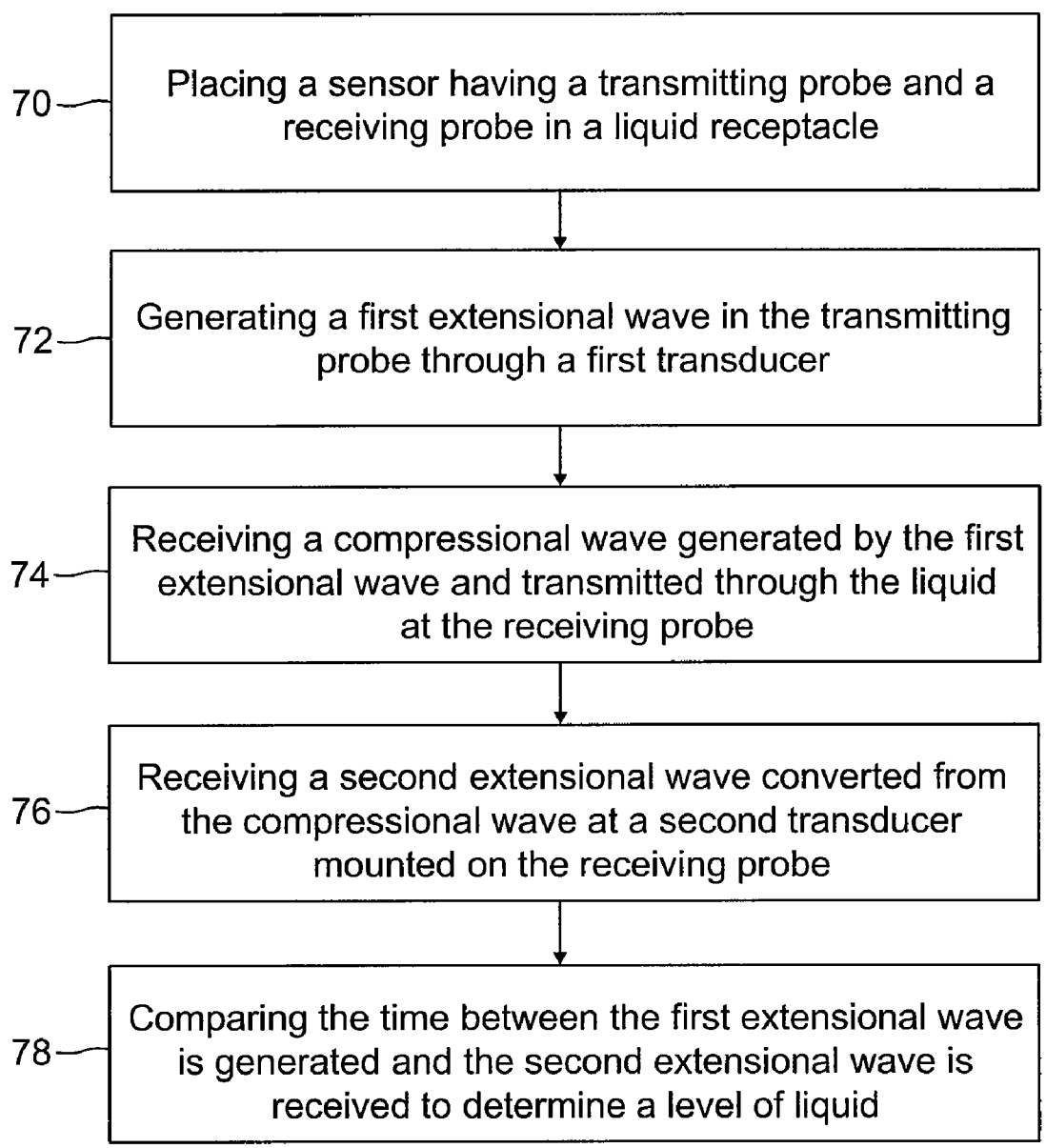
FIG. 10 illustrates a flow chart of a method of determining a liquid level, according to an embodiment of the present invention.

FIG. 10 illustrates a flow chart of a method of determining a liquid level, according to an embodiment of the present invention. At 70, a sensor including a transmitting probe and a receiving probe is placed in a liquid receptacle that contains a liquid. Then, at 72, a processor sends a signal to a first transducer mounted on the transmitting probe to generate an extensional wave within the transmitting probe. The extensional wave generates a compressional wave at the liquid surface. The compressional wave travels toward and is received by the receiving probe at 74. As the compressional wave meets the receiving probe, a second extensional wave is generated in the receiving probe at 76. The time between the generation of the first extensional wave and the detection of the second extensional wave at a second transducer mounted to the receiving probe is then used to determine the level of the liquid at 78, as described above.

Thus, embodiments of the present invention provide an efficient and cost-effective system and method for detecting the presence and level of liquid or ice within a particular receptacle.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A system for detecting a presence of a liquid within a liquid receptacle, the system comprising:
   a sensor comprising a transmitting probe and a receiving probe positioned within the liquid receptacle, said transmitting probe comprising a first transducer and said receiving probe comprising a second transducer, said first transducer generating a first extensional wave through said transmitting probe that produces a compressional wave in a liquid contained within the liquid receptacle when the first extensional wave contacts an interface between said transmitting probe and a surface of the liquid, the compressional wave contacting said receiving probe and generating a second extensional wave within said receiving probe that is received by said second transducer; and
   a processor in electrical communication with said first and second transducers, said processor monitoring said first and second transducers to determine the presence and level of the liquid within the liquid receptacle based on a time between generation of the first extensional wave by said first transducer and reception of the second extensional wave by said second transducer, wherein said processor detects a transmit time for the first extensional wave to travel down a length of said transmitting probe, reflect, and return, wherein said processor detects an elapsed time from initiation of a transmit pulse in said first transducer to detection of a leading edge of the second extensional wave in said receiving probe, wherein said processor determines a difference between the elapsed time and the transmit time as time in the liquid, and wherein said processor determines the level of the liquid by multiplying a difference between the elapsed time and the time in the liquid plus a dry time in the dry portions of one or both of said transmitting and receiving probes by a length of one or both of said transmitting and receiving probes and dividing by the transmit time.

2. The system of claim 1, wherein one or both of said transmitting and/or receiving probes comprises a solid rod.

3. The system of claim 1, wherein one or both of said transmitting and/or receiving probes comprises a planar strip.

4. The system of claim 1, wherein one of said transmitting or receiving probes comprises a hollow open-ended cylinder within the liquid receptacle and the other of said transmitting or receiving probes comprises a solid rod within said hollow open-ended cylinder.

5. The system of claim 1, wherein each of said first and second transducers comprises a piezoelectric or electromagnetic acoustic transducer (EMAT) transducer.

6. The system of claim 1, wherein said transmitting and receiving probes are coupled together through a buoyant sliding carriage, wherein said buoyant sliding carriage includes passages through which said transmitting and receiving probes are slidably positioned, wherein a position of said buoyant sliding carriage with respect to said transmitting and receiving probes depends on the level of the liquid within said liquid receptacle, and wherein the level of the liquid determined by said processor depends on a position of said buoyant sliding carriage along said transmitting and receiving probes.

7. The system of claim 1, wherein said processor detects another time from initiating the transmit pulse by said first transducer to detecting a second leading edge of a third extensional wave in said receiving probe.

8. The system of claim 1, wherein said processor monitors said first and second transducers to determine one or both of conductivity and/or viscosity of the liquid within the liquid receptacle.

9. A method of detecting a presence of a liquid within a liquid receptacle, the method comprising:
    positioning a sensor having a transmitting probe and a receiving probe within the liquid receptacle;
    generating a first extensional wave through a first transducer mounted on the transmitting probe;
    producing a compressional wave in a liquid contained within the liquid receptacle when the first extensional wave impinges upon a liquid surface;
    receiving the compressional wave at the receiving probe;
    producing a second extensional wave within the receiving probe when the compressional wave contacts the receiving probe; and
    using a processor to monitor the first and second transducers to determine the presence and level of the liquid within the liquid receptacle based on a time between generation of the first extensional wave and reception of the second extensional wave at the transducer,
    wherein said using comprises: detecting a transmit time for the first extensional wave to travel down a length of the transmitting probe, reflect, and return; detecting an elapsed time from initiation of a transmit pulse in the first transducer to detection of a leading edge of the second extensional wave in the receiving probe; determining a difference between the elapsed time and the transmit time as time in the liquid; and determining the level of the liquid by multiplying a difference between the elapsed time and the time in the liquid plus a dry time in the dry portions of one or both of the transmitting and receiving probes by a length of one or both of the transmitting and receiving probes and dividing by the transmit time.

10. The method of claim 9, comprising coupling the transmitting and receiving probes together with a buoyant sliding carriage, wherein the buoyant sliding carriage includes passages through which the transmitting and receiving probes are slidably positioned, wherein a position of the buoyant sliding carriage with respect to the transmitting and receiving probes depends on the level of the liquid within the liquid receptacle, and wherein the level of the liquid determined by the processor depends on a position of the buoyant sliding carriage along the transmitting and receiving probes.

11. The method of claim 9, comprising using the processor to monitor the first and second transducers to determine one or both of conductivity and/or viscosity of the liquid within the liquid receptacle.

12. A sensor for detecting a presence of a liquid within a liquid receptacle, the sensor comprising:
    a transmitting probe comprising a first transducer, said transmitting probe configured to be positioned within the liquid receptacle;
    a receiving probe comprising a second transducer, said receiving probe configured to be positioned within the liquid receptacle, said transmitting and receiving probes being spaced a known distance apart,
    said first transducer operable to generate a first extensional wave through said transmitting probe, said first extensional wave contacting a surface of a liquid and producing a compressional wave in the liquid,
    said receiving probe generating a second extensional wave within said receiving probe when the compressional wave contacts said receiving probe, the second extensional wave being received by said second transducer; and
    a processor configured to detect a transmit time for the first extensional wave to travel down a length of said transmitting probe, reflect, and return, wherein said processor detects an elapsed time from initiation of a transmit pulse in said first transducer to detection of a leading edge of the second extensional wave in said receiving probe, wherein said processor determines a difference between the elapsed time and the transmit time as time in the liquid, and wherein said processor determines a level of the liquid within the liquid receptacle by multiplying a difference between the elapsed time and the time in the liquid plus a dry time in the dry portions of one or both of said transmitting and receiving probes by a length of one or both of said transmitting and receiving probes and dividing by the transmit time.

13. The sensor of claim 12, wherein one or both of said transmitting and/or receiving probes comprises a solid rod and/or a planar strip.

14. The sensor of claim 12, wherein one of said transmitting or receiving probes comprises a hollow open-ended cylinder within the liquid receptacle and the other of said transmitting or receiving probes comprises a solid rod within said hollow open-ended cylinder.

15. The sensor of claim 12, wherein each of said first and second transducers comprises a piezoelectric or electromagnetic acoustic transducer (EMAT) transducer.

16. The sensor of claim 12, wherein said transmitting and receiving probes are coupled together through a buoyant sliding carriage, wherein said buoyant sliding carriage includes passages through which said transmitting and receiving probes are slidably positioned, wherein a position of said buoyant sliding carriage with respect to said transmitting and receiving probes depends on the level of the liquid within said liquid receptacle, and wherein the level of the liquid determined by said processor depends on a position of said buoyant sliding carriage along said transmitting and receiving probes.

* * * * *